UNITED STATES PATENT OFFICE.

WILLIAM N. BLAKEMAN, JR., OF MOUNT VERNON, NEW YORK.

PAINT-VEHICLE.

1,375,352. Specification of Letters Patent. Patented Apr. 19, 1921.

No Drawing. Application filed June 12, 1917. Serial No. 174,253.

*To all whom it may concern:*

Be it known that I, WILLIAM N. BLAKEMAN, Jr., a citizen of the United States, and resident of the city of Mount Vernon, in the county of Westchester and State of New York, have invented a new and useful Paint-Vehicle, which invention is fully set forth in the following specification.

The object of this invention is to improve the spreading and accelerate the drying of all pigments which are refractory to oil-vehicles; and the invention will first be described in detail and then set forth in the claims.

It is well known that many of the anhydrous pigments—that is, pigments which carry no combined water—particularly the white pigments, will neither spread satisfactorily nor dry with facility when ground in the usual linseed or other oil-vehicle. But I have discovered that when an anhydrous pigment is ground with a hydrogenized oil, the compound formed will follow the brush in a smooth, uniform, and homogeneous film; and, while this film will be slow in drying, the drying will be accelerated by the addition of a drying oil, such as tung oil, or a semi-drying oil, such as marine animal oil, or a combination of both.

The process of hydrogenation of oils is a progressive one and can be carried on from an incipient attack with hydrogen to full saturation or solidification, with a gradual reduction in general of both refractive index and specific gravity.

In carrying out my invention, the entire mass of oil-vehicle with which the pigment is to be combined may be hydrogenated, but as the varying character of the pigments will require varying degrees of hydrogenation, it will be found more satisfactory, instead of hydrogenizing the whole mass of vehicle, to incorporate therein hydrogenated oil. In this way hydrogenated oil of a standardized specific gravity may be employed, and a sufficient quantity of it used to affect the varying pigments, without attempting to hydrogenate the entire oil-vehicle to the same efficacious point.

The hydrogenated oil employed may be used in the condition in which it exists at any stage of the process of hydrogenation, but the best effects will result from the use of hydrogenated oil which still continues to flow, at common temperatures, after a run with hydrogen, on catalysts, for a half or three quarters of an hour, and has the appearance of chilled honey or thick sugar syrup. If a very thick, or solidified, hydrogenated oil be used, it is liable to chill out from the vehicle and precipitate.

Any of the hydrogenated oils can be used, such as linseed, soja bean, cotton seed, menhaden, whale, seal, and the like; and although hydrogenated oil mixed with its parent oil—for example hydrogenated linseed-oil with linseed oil—will give the best effects in general, it may be found advantageous, for economical reasons, to use some of the other hydrogenated oils.

The percentage of hydrogenated oil to oil-vehicle will depend on the nature of the composition and may be varied as required by practical conditions. If linseed oil be chosen as the vehicle, as little as five per cent. (5%) of hydrogenated oil will show a decided improvement in the spreading of mildly refractory pigments, while from fifteen to twenty per cent. may be used with pigments of a stubbornly resisting character.

By the term zinc lead as used herein I intend to refer to the class of pigments which have been on the market for many years and are now well known in the trade by that name. They are all composed of zinc oxid and lead sulfate in varying proportions, the one which I prefer, consisting substantially of 60 per cent. zinc oxid and 40 per cent. lead sulfate.

The following are examples of compositions which will give good results:

(1) Eighty (80) parts linseed oil showing .9287 sp. gr., carrying fifteen per cent. (15%) of hydrogenated linseed oil showing .9219 sp. gr., when ground with one hundred (100) parts of a zinc-lead pigment (sixty per cent. (60%) zinc oxid and forty per cent. (40%) lead sulfate) with the usual quantity of commercial liquor drier, will firm or set in from twelve (12) to fifteen (15) hours under favorable atmospheric conditions, and subsequently harden or indurate satisfactorily. If from six (6) to eight (8) parts of tung oil be added, the paint will firm or set in from six (6) to eight (8) hours; and if a mixture of half tung oil and half marine animal oil be used, instead of tung oil alone, the time of firming will be reduced to four (4) or five (5) hours.

(2) Eighty (80) parts of linseed oil showing .9287 sp. gr.; fifteen per cent. (15%)

of hydrogenated linseed-oil showing .9219 sp. gr.; one hundred and fifty (150) parts of barium sulfate (natural); and thirty (30) parts of zinc-lead (sixty per cent. (60%) zinc oxid and forty (40%) lead sulfate) with the usual quantity of commercial liquid drier, will spread with great homogeneity and firm or set in from sixteen (16) to eighteen (18) hours, and subsequently indurate satisfactorily.

(3) Eighty (80) parts linseed oil, showing .9287 sp. gr.; fifteen per cent. (15%) hydrogenated linseed-oil, showing .9219 sp. gr.; fifteen per cent. (15%) tung oil; fifteen per cent. (15%) marine animal oil; one hundred and fifty (150) parts barium sulfate (natural); and thirty (30) parts zinc-lead carrying sixty per cent. (60%) zinc oxid and forty per cent. (40%) lead sulfate; with the usual quantity of commercial liquid drier will firm or set in four (4) or five (5) hours and subsequently indurate in a satisfactory manner.

For all tinted and dark colors, this formula, with slight variations, will be found satisfactory as a most economical and permanent protective covering.

A small percentage—say from one half of one per cent. ($\frac{1}{2}$ of 1%) to three per cent. (3%) of one or more of the animal, vegetable, or mineral residuals, fats, waxes, stearins, still-ends, and the like may be added to the composition, if desired, and they will be found to act as a repellent agent and render the surface of the paint-film more repellent to atmospheric and abrasive influences.

Any suitable commercial liquid drier may be used. All of the oil-factors of the compounded oil-vehicle, must, for the best effects, be water free.

The paint composition made with the vehicle above described, is claimed in another application filed herewith and bearing the Serial Number 174254.

Having thus described my invention, I claim:

1. A mixture of a hydrogenated oil; tung oil; and marine animal oil.
2. A mixture of an oil-vehicle; hydrogenated oil; tung oil; and marine animal oil.
3. A mixture of linseed oil; hydrogenated linseed-oil; tung oil; and marine animal oil.

WM. N. BLAKEMAN, Jr.